July 15, 1924.

J. G. FURLAN 1,501,766

ROTATING NUT SWAGING AND EXPANDING MACHINE

Filed May 1, 1923

WITNESSES

INVENTOR
John Guy Furlan
BY Knight Bro
ATTORNEYS

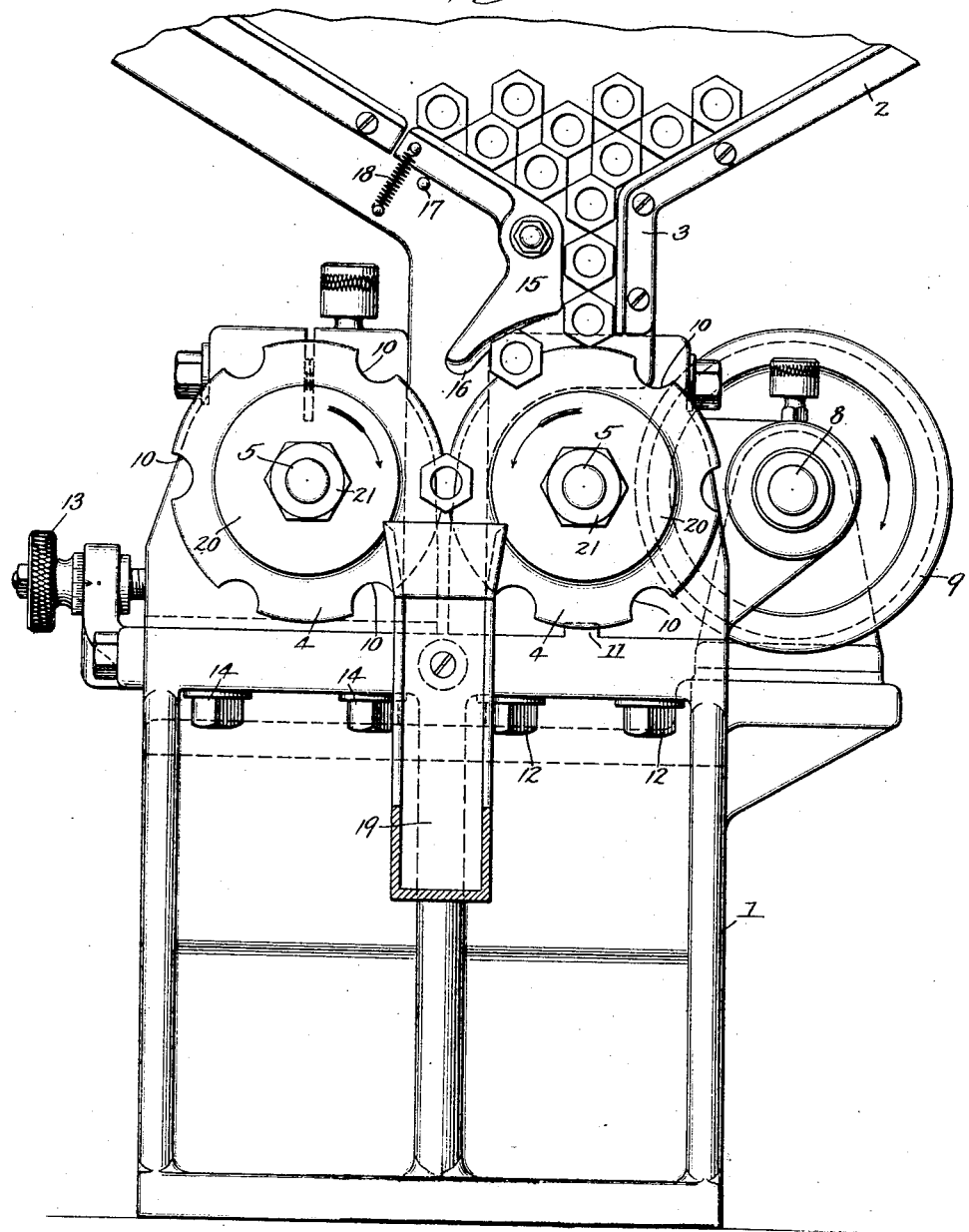

Patented July 15, 1924.

1,501,766

UNITED STATES PATENT OFFICE.

JOHN GUY FURLAN, OF NEW YORK, N. Y., ASSIGNOR TO FURLAN NUT MACHINERY CORPORATION, OF NEW YORK, N. Y., A CORPORATION OF NEW YORK.

ROTATING NUT SWAGING AND EXPANDING MACHINE.

Application filed May 1, 1923. Serial No. 635,879.

*To all whom it may concern:*

Be it known that I, JOHN GUY FURLAN, a subject of the King of Italy, a resident of the city, county, and State of New York, have invented certain new and useful Improvements in Rotating Nut Swaging and Expanding Machines, of which the following is a specification.

My invention relates to machines for swaging such lock nuts as are characterized by a circumferential groove against the sides of which it is desired to exert an expanding pressure.

My improved machine comprises two rotating swaging dies to which the nuts are fed from a suitable hopper and between which the nuts are gripped one at a time by suitable recesses in the dies to bring about the desired expansion of the nut in a rapid and accurate manner.

In the accompanying drawings:—

Figure 2 is a front view of the machine, and

Figure 3 shows a side view of a grooved nut with the swaging disks about to enter the groove.

Figure 1:
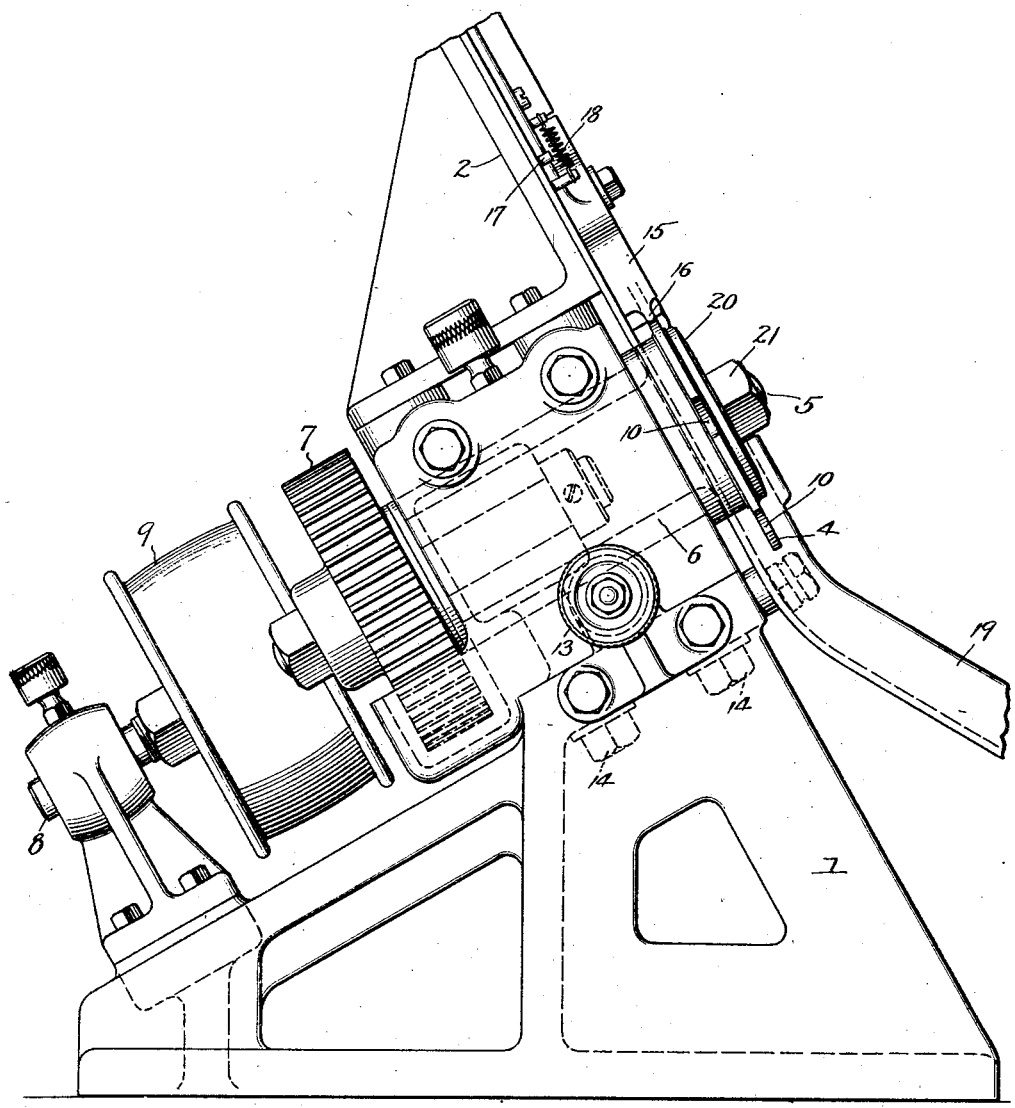
Figure 1 represents a side elevation of a machine embodying my invention.

In the drawings, 1 indicates a suitable foundation frame upon which is supported a hopper 2 having a chute portion 3 at its lower extremity. I prefer to have the hopper placed at an angle as shown so that the nuts will rest by gravity against the back of the hopper. Two notched swaging disks 4 are mounted on rotatable mandrels 5 which are suitably journalled at 6 in an inclined position on the frame and are driven by gears 7 from a pinion on a driving shaft 8 upon which shaft is mounted the driving pulley 9. Both mandrels 5 have gears which mesh with each other in such a way as to bring notches 10 in the swaging disks opposite each other at the point of nearest approach of the said disks. One of the disks 4 is placed immediately under the hopper and has its journal bearing secured to the frame against lateral displacement by key 11 and bolts 12. The other disk has its journal bearing mounted slidably on the frame so that it may be adjusted by screw 13 to accommodate different sizes of nuts or different degrees of desired expansion. After being properly adjusted this bearing is clamped to the frame by means of bolts 14.

A nut agitator 15 forms one side of the hopper chute 3 and also part of the side of the hopper. At its lower edge at 16 it is made so as to be crowded upwardly when the same rides in the groove of the nut as plainly shown in Figure 2, the vibrator returning to rest against the pin 17 on the frame by the action of spring 18 when the nut passes beyond the range of the lower extension 16. The consequent vibration of this agitator will result in the vibration of the nuts in the hopper so that they will arrange themselves in an orderly manner in passing thru the chute and will not become clogged. The swaging disks 4 are secured on the mandrel by a face plate 20 and the clamping nuts 21.

The operation of the machine is as follows:—

A supply of nuts being furnished to the hopper, the nuts as they descend thru the chute of the hopper drop into the successive notches of the swaging disk and are carried around one by one until they meet the corresponding notch of the other swaging disk and as they pass the point of nearest approach of the disks, the said disks in crowding between the walls of the groove in the nut force the nut to become expanded axially so as to form the same into a lock nut. Further rotation of the swaging disks carries the nut down to a point where it is no longer engaged by both disks and is free to be discharged into a chute 19, the upper part of which is made to straddle the disk so that the nut if it does not drop free is knocked off of the disk by impinging against the side of the discharge chute.

I have described herein a preferred form that my nut machine may take, but I reserve the right to substitute for the elements shown equivalent mechanism that will perform the same purpose.

I claim:—

1. In a nut expanding machine the combination of a frame two rotatable mandrels journalled thereon and carrying swaging disks, a hopper for feeding nuts to said swaging disks, the said swaging disks having notches adapted to convey the nuts from the hopper to the point of nearest approach of the disks and there expand the nuts by squeezing between the sides of the grooves in the nuts.

2. In a nut expanding machine the combination of a frame, two rotatable mandrels journalled thereon and carrying swaging disks, a hopper for feeding nuts to said swaging disks, the said swaging disks having notches adapted to convey the nuts from the hopper to the point of nearest approach of the disks and there expand the nuts by squeezing between the sides of the grooves in the nuts, and means for adjusting the distance between the swaging disks.

3. In a nut expanding machine the combination of a frame, two rotatable mandrels journalled thereon and carrying swaging disks, a hopper for feeding nuts to said swaging disks, the said swaging disks having notches adapted to convey the nuts from the hopper to the point of nearest approach of the disks and there expand the nuts by squeezing between the sides of the grooves in the nuts, means for adjusting the distance between the swaging disks, and means for agitating the nuts in the hopper.

JOHN GUY FURLAN.